US012109769B2

(12) United States Patent
Meschenmoser et al.

(10) Patent No.: US 12,109,769 B2
(45) Date of Patent: Oct. 8, 2024

(54) METHOD FOR MANUFACTURING SPECTACLE LENSES ACCORDING TO A PRESCRIPTION

(71) Applicant: Carl Zeiss Vision International GmbH, Aalen (DE)

(72) Inventors: Ralf Meschenmoser, Essingen (DE); Michael Pittolo, Glenelg (AU)

(73) Assignee: Carl Zeiss Vision International GmbH, Aalen (DE)

( * ) Notice: Subject to any disclaimer, the term of this patent is extended or adjusted under 35 U.S.C. 154(b) by 1052 days.

(21) Appl. No.: 17/028,413

(22) Filed: Sep. 22, 2020

(65) Prior Publication Data

US 2021/0001579 A1   Jan. 7, 2021

Related U.S. Application Data

(63) Continuation of application No. PCT/EP2019/000089, filed on Mar. 23, 2019.

(30) Foreign Application Priority Data

Mar. 23, 2018   (EP) .................................... 18163650

(51) Int. Cl.
   *B29D 11/00*     (2006.01)
   *B24B 13/005*    (2006.01)

(52) U.S. Cl.
   CPC .... *B29D 11/00009* (2013.01); *B24B 13/0055* (2013.01); *B24B 13/0057* (2013.01);
   (Continued)

(58) Field of Classification Search
   CPC ........ B29D 11/00009; B29D 11/00865; B29D 11/00942; B29D 11/00596;
   (Continued)

(56) References Cited

U.S. PATENT DOCUMENTS

2007/0082969 A1* 4/2007 Malik ........................ C09J 7/38
                                                   522/178
2010/0315693 A1* 12/2010 Lam ...................... G02F 1/0018
                                                   359/275

(Continued)

FOREIGN PATENT DOCUMENTS

CN            101945730 A      1/2011

*Primary Examiner* — Emmanuel S Luk
*Assistant Examiner* — Elisa H Vera
(74) *Attorney, Agent, or Firm* — Tautz & Schuhmacher LLC; Georg Hasselmann

(57) ABSTRACT

A method for manufacturing a spectacle lens according to a prescription includes:
   blocking or fixing a semi-finished spectacle lens blank having a first face possessing a final curvature and a second face opposite the first face on a block piece or a vacuum or holding chuck, respectively, wherein the first face of the semi-finished spectacle lens blank faces the block piece or the vacuum or holding chuck, respectively;
   surfacing the blocked or fixed semi-finished spectacle lens blank on the second face to obtain a final curvature of the second face; and
   deblocking the surfaced spectacle lens blank from the block piece or removing the surfaced spectacle lens blank from the vacuum or holding chuck prior to any subsequent coating step. The first face is coated with a top coating having a surface energy of less than 20 mJ/m$^2$.

20 Claims, 7 Drawing Sheets

(52) U.S. Cl.
CPC .. *B29D 11/00865* (2013.01); *B29D 11/00942* (2013.01); *B29D 11/00596* (2013.01); *B29D 11/00644* (2013.01)

(58) Field of Classification Search
CPC .......... B29D 11/00644; B24B 13/0055; B24B 13/0057; B24B 13/005; B24B 13/0031
See application file for complete search history.

(56) References Cited

U.S. PATENT DOCUMENTS

| | | | |
|---|---|---|---|
| 2011/0033615 A1 | 2/2011 | Breme et al. | |
| 2011/0090456 A1* | 4/2011 | Breme | B29D 11/00865 351/159.75 |
| 2011/0223418 A1* | 9/2011 | Habassi | B29D 11/00432 156/182 |
| 2016/0306198 A1* | 10/2016 | Cadet | C09D 183/08 |
| 2016/0318147 A1* | 11/2016 | Meschenmoser | B29D 11/00942 |
| 2018/0014411 A1* | 1/2018 | Vronsky | H10K 99/00 |

* cited by examiner

METHOD FOR MANUFACTURING SPECTACLE LENSES ACCORDING TO A PRESCRIPTION

CROSS REFERENCE TO RELATED APPLICATIONS

This application is a continuation application of international patent application PCT/EP2019/000089, filed Mar. 23, 2019, designating the United States and claiming priority from European application 18163650.7, filed Mar. 23, 2018, and the entire content of both applications is incorporated herein by reference.

TECHNICAL FIELD

The present disclosure relates to a method for manufacturing spectacle lenses according to a prescription.

BACKGROUND

A spectacle semi-finished lens blank generally has a first face with a predetermined curvature and a second face, opposite the first face on which a surface contour is generated by a machining process such that the finished spectacle lens fulfills the desired optical properties for a wearer in terms of his predetermined prescription. Such a machining process is described in EP 0 857 993 A2 with reference to WO 97/13603 A2, for example.

The overall machining process is generally referred to as "lens surfacing" and the overall object is to yield a finished spectacle lens so that the first and second face curvatures cooperate to yield the desired optical properties. In addition to this the first and/or second faces of the lens are usually coated to provide the finished spectacle lens with an enhanced ability to resist scratching (by means of a "hard coating"), with a low residual reflection and a desired color (by means of an "antireflection coating"), and/or with certain surface properties such as hydrophobic, oleophobic and dust repelling properties (by means of a "top coating"). Usually also a further machining process takes place (the so-called "edging"), the aim of which is to finish-machine the edge of the spectacle lens in such a way that the spectacle lens may be inserted into a spectacle frame. In all these process steps the spectacle lens (blank) must somehow be held in the machining machine(s) and coating apparatus respectively.

EP 2 093 018 A1 describes in paragraphs [0002] to [0010] a conventional method for manufacturing spectacle lenses according to a prescription which follows the processing steps shown in FIG. 1: Firstly, a suitable right and/or left semi-finished spectacle lens blank SFB is removed from a semi-finished product store (step 102). The term "semi-finished" is used to mean that the spectacle lens blanks, which are usually round or oval in plan view and have not yet been edged, have already been molded, machined or in another way contoured (surfaced) on one of their two optically active faces only. The surface geometry of said one of their two optically active faces being indicated with the reference sign "cx" is finished and will not be changed any more.

Nevertheless, in general said one of their two optically active faces of the semi-finished spectacle lens blanks may be covered by a coating comprising one or more sub-coatings each comprising one or more layers and which will be described in more detail in the following. In paragraphs [0002] to [0010], however, there is no disclosure with regard to any coating being on top of the pre-finished surface cx leading to the conclusion that the semi-finished spectacle lens blank SFB having no coating on the surface cx as indicated in FIG. 1 according to the process step 102.

The semi-finished spectacle lens blanks SFB are then prepared for a subsequent blocking operation, namely by applying a suitable protective film or a suitable protective lacquer to protect the optically active face cx which has already been machined or contoured, i.e., the first face cx or blocking face cx.

The so-called "blocking" 104 of the semi-finished spectacle lens blanks SFB then takes place. During this, the semi-finished spectacle lens blank SFB is joined to a suitable block piece, for example a lens block according to German standard DIN 58766: 2017-02 or document EP 1 593 458 A2. To this end, the block piece is firstly brought into a predefined position with respect to the protected first face cx of the semi-finished spectacle lens blank SFB, and then in this position the space between block piece and semi-finished spectacle lens blank SFB is filled with a molten material (normally a metal alloy or wax) or an adhesive composition that is curable, e.g., by ultraviolet or visible light, as described in EP 2 011 604 A1 for instance. Once this material has solidified or cured, the block piece forms a holder or support for machining the second face cc of the semi-finished spectacle lens blank SFB. The block piece is grasped by a chuck or other suitable coupling means during lens generation to provide in particular secure mounting to the profiling machine while avoiding damage to the spectacle lens.

Spectacle lens surfacing is carried out then using profiling machines which typically have a cutter of some type that is moved across the second face cc of the semi-finished spectacle lens blank SFB to give the second face cc its macrogeometry according to the wearer's prescription. The semi-finished spectacle lens blank SFB may be stationary or rotating during the cutting operation, depending on the particular profiling machine which is being used. Typical machining processes for surfacing spectacle lenses include single point diamond turning (as the presently typical fine cutting process for plastic materials and described in, e.g., document EP 1 719 585 A2), diamond tool fly-cutting, milling (as the presently typical rough cutting process for plastic materials and described in, e.g., document EP 0 758 571 A1), and grinding processes, applied depending on the lens material. This step is indicated in FIG. 1 with reference number 106.

Usually fine machining of the ophthalmic lenses then takes place, in which the pre-machined second face cc of the respective semi-finished spectacle lens blank SFB is given the desired microgeometry, as described, e.g., in documents EP 1 473 116 A1 and EP 1 698 432 A2. Depending on inter alia the material of the spectacle lenses, the fine machining process is divided into a fine grinding operation and a subsequent polishing operation, or includes only a polishing operation if a polishable second face cc has already been produced during the pre-machining stage. The step of the polishing operation is indicated in FIG. 1 with reference number 108.

Only after the polishing operation is the spectacle lens blank separated from the lens block ("deblocking") before cleaning steps are carried out. Both actions are indicated in FIG. 1 by means of the process step 110. The process steps 106, 108 during which the spectacle lens is blocked to the block piece are outlined in FIG. 1 by means of a dashed rectangle being designated with the reference number 120.

Then the coating process(es) take(s) place that, depending on among other things the material of the lens blank, may include spin (or dip) coating of the deblocked spectacle lens blank so as to provide at least the second face cc of the lens blank with a hard coating HC or the like, as described, e.g., in US 2008/0035053 A1, wherein the spectacle lens blank is held in the spin coating apparatus by means of a lens holder that has a suction cup for instance. FIG. 1 designates this step the reference number 112.

At any rate coating includes vacuum coating of the deblocked spectacle lens blank so as to provide at least the second face cc of the lens blank with a mono- or a multi-layered anti-reflection coating AR and optionally a top coating TC serving the above mentioned purpose(s). In the vacuum coating process the spectacle lens blank is clamped to a substrate carrier of a rotary carrier device that is located in a vacuum chamber in a vertically spaced relation with respect to an evaporation source for emitting a vapor stream onto the lens blank mounted on the substrate carrier, as described, e.g., in document EP 0 806 492 A1. FIG. 1 indicates this step the reference number 114.

After the coating step(s) 112, 114 the ophthalmic lens blank usually is edged so that the spectacle lens can be inserted into a spectacle frame in step 116. To this end, the coated spectacle lens blank is blocked again, at this time however to a different, smaller block piece by means of an adhesive film portion for instance, as described, e.g., in document EP 1 243 381 A2. The edging process may also include the forming of bores, grooves, channels and/or bevels corresponding to the respective mounting requirements in the edge area of the spectacle lens, as described, e.g., in document EP 1 243 380 A2.

It is herewith worth mentioning that, e.g., US 2003/0049370 A1 discloses the deposition of a temporary protective layer performed by evaporation coating onto the lens surface prior to application of a holding pad such as a self-adhesive sticker, for example a two-sided adhesive, e.g., a 3M self-adhesive sticker and subsequently applied acorn element. The protective layer according to this document or its counterpart WO 02/092524 A1 is a mineral layer comprising one or more metallic fluorides such as $MgF_2$, $LaF_3$, $AlF_3$ or $CeF_3$ or one or more metallic oxides such as titania, alumina or zirconia. The above cutting and edging processes are named in these documents as trimming step consisting in machining of the glass edge or periphery so as to conform it to the required dimensions for adapting the spectacle lens to the spectacle frame in which it is intended to be accommodated.

A similar protective layer is disclosed in WO 2004/110946 A1. This document discloses a method for treating an ophthalmic lens comprising two main sides, wherein at least one side comprises an organic or mineral external layer coated with a $MgF_2$ temporary protective layer, the method comprising a specific treatment step selected amongst the following steps: (i) a liquid phase chemical treatment of the temporary protective layer, leading to the formation of MgO and/or $Mg(OH)_2$ in and/or on the temporary protective layer, (ii) a deposit of at least one non fluorinated metallic oxide and/or of at least one non fluorinated metallic hydroxide on the temporary protective layer through transfer thereof from an electrostatic film or through vacuum evaporation thereof directly on the temporary protective layer, (iii) the deposit of the $MgF_2$ temporary protective layer on the external layer is performed through vacuum evaporation at a speed lower than 0.5 nm/s, typically lower than or equal to 0.3 nm/s.

Finally, after edging and a further deblocking step the spectacle lens is cleaned again (not indicated in FIG. 1 as a separate step in order to show the symmetry or asymmetry to the process-sequences shown in FIGS. 2 to 5) and ready for inspection (step 118) and insertion into or mounting to the spectacle frame.

As a first disadvantage of the process sequence shown in FIG. 1 document EP 2 093 018 A1 mentions the fact that the spectacle lens blank needs to be deblocked after surfacing prior to coating, and then again blocked after coating prior to edging, for this requiring manual operations that are time-consuming and labor-intensive. In order to overcome this disadvantage this document proposes a process shown in FIG. 17 of the document and being described in the following with reference to FIG. 2 attached to the present description.

Basically, this method comprises the steps of:
removing a suitable right and/or left semi-finished spectacle lens blank SFB from a semi-finished product store (step 202),
blocking a semi-finished spectacle lens blank SFB with its blocking face cx on the workpiece mounting face portion of a block piece with the aid of a blocking material (step 204),
processing the blocked semi-finished spectacle lens blank SFB on the second face cc and optionally the edge to obtain a processed spectacle lens (step 220), and deblocking (step 216) the processed spectacle lens from the block piece, with the characterizing feature that the spectacle lens blank remains on the proposed block piece throughout the whole processing stage or step 220.

According to FIG. 2, the latter stage or step 220 generally comprises the following substeps:
"generating", i.e., machining of the blocked semi-finished spectacle lens blank SFB to give the second face cc a macrogeometry according to the prescription (step 206);
"polishing", i.e., fine machining of the blocked spectacle lens blank SFB to give the second face cc the required microgeometry (step 208);
cleaning the blocked spectacle lens blank that has been machined and fine machined; (optionally) spin (or dip) coating of the blocked spectacle lens blank in order to provide the second face cc with a hard coating HC, or a primer, or a primer and a hard coating HC (step 210);
vacuum coating of the blocked spectacle lens blank to provide an anti-reflection coating AR (normally consisting of four to seven layers made up of two to four materials with different refractive indices) and (optionally) a top coating TC such as a hydrophobic and/or oleophobic and/or dust repelling coating on the second face cc (step 212);
and (optionally) edging of the blocked spectacle lens blank to give the edge the required geometry (step 214) so that the processed spectacle lens, after deblocking (step 216) and final inspection (218), is ready for insertion into a spectacle frame or a spectacle holder.

EP 2 138 271 A1 identifies a disadvantage of the process step sequence recommended in EP 2 093 018 A1, namely that in the case if a top coating TC is present on the first, blocking face cx of the semi-finished lens blank. Paragraph [0004] of this document explicitly explains that "the hydrophobic and/or oil-repellent anti-stain top coatings TC [ . . . ] most often consist of fluorosilane-type materials that reduce the surface energy so as to prevent the adhesion of greasy stains which are thereby easier to remove. One of the problems associated with such top coating TC is that it may achieve such an efficiency that the adhesion at the interface between the blocking material and the first, blocking face cx of the lens blank is thereby altered. As a result there is a risk that the adhesive connection between the lens blank and the block piece cannot sufficiently withstand the forces that are exerted on the lens blank during the machining thereof. At the worst the lens blank comes off the block piece and is ruined."

Referring to US 2003/0049370 A1 but not addressing the fact that this document does relate to blocking operations for trimming, i.e., edging purposes, only, but not to blocking operations being suitable for surface generating and polishing purposes, EP 2 138 271 A1 states that the referred document shall address the problem of blocking hydrophobic and/or oil-repellent anti-stain top coated lens blanks by applying a temporary protective layer imparting to the lens blank a surface energy at least equal to 15 mJ/m$^2$ so as to achieve a sufficient adhesion at the interface between a holding pad and the lens blank for holding pads conventionally used in the technical field to hold the lens blank on a block piece during the machining steps.

Since EP 2 138 271 A1 seems to have overlooked that US 2003/0049370 A1 determined sufficient adhesion during trimming operations, only, the document admits that "with this approach it is difficult already to provide for sufficient adhesion at the interface between the hydrophobic and/or oil-repellent surface coating on the one side and the temporary protective layer on the other side. Once sufficient adhesion has been achieved at this interface it must be ensured that the hydrophobic and/or oil-repellent surface coating is not damaged upon removal of the temporary protective layer after processing the lens. This is exceptionally difficult if both the hydrophobic and/or oil-repellent surface coating and the temporary protective layer consist of an organic material." From this admittance one may suspect that at the filing date of the application with the publication number EP 2 138 271 A1 at least applicant was not able to provide sufficient adhesion for withstanding generating and polishing steps outlined above with reference to FIG. 2. This may not be surprising since forces and torques during edge trimming operations in general are well below those forces and torques during lens surface generating and polishing operations. In addition grinding and polishing liquid may remove the protective layer proposed in US 2003/0049370 A1 during generating and polishing operations.

In the intention to overcome the drawback above EP 2 138 271 A1 proposes the process sequences shown in FIGS. 1 and 2 of EP 2 138 271 A1 which will be described in the following with reference to FIGS. 3 and 4 attached hereto.

The two exemplary embodiments of the method for manufacturing spectacle lenses according to a prescription, that are illustrated in FIGS. 3 and 4 by way of flow charts, generally have in common the following five main Rx process steps:

initially providing a semi-finished lens blank SFB having a first face cx, a second face cc opposite the first face cx, and an edge between the first face cx and the second face cc, the first face cx possessing a final curvature and being coated with a hard coating HC and an antireflection coating AR as an outer layer (that in the case of FIG. 4 is then covered with a temporary protection layer PL prior to blocking; steps 302, 402);

blocking with the aid of a blocking material the lens blank SFB on a block piece, wherein the first face cx of the lens blank SFB faces the block piece (steps 304, 404);

processing the blocked lens blank SFB on the second face cc and optionally the edge to obtain a processed lens (see the rectangles in broken lines in FIGS. 3 and 4; steps 322, 424)

deblocking the processed lens from the block piece and cleaning it (steps 316, 416); and applying on top of the antireflection coating AR on the first face cx of the processed lens (after removal of the temporary protection layer PL in the case of FIG. 4; step 418) a top coating TC selected from a group comprising hydrophobic, oleophobic and dust repelling coatings, as the essential final real processing step (steps 318, 420) final inspection (steps 320, 422) of the processed lens (and subsequent insertion into/mounting to the spectacle frame).

The processing step (322, 424) in both cases includes the following sub-steps (cf. again the rectangles in broken lines in FIGS. 3 and 4):

"generating", i.e., machining of the blocked spectacle lens blank SFB to give the second face cc a macrogeometry according to the prescription (steps 306, 406);

"polishing", i.e., fine machining of the blocked spectacle lens blank SFB to give the second face cc the required microgeometry (steps 308, 408);

cleaning the blocked spectacle lens blank SFB that has been machined and fine machined, and (optionally) spin (or dip) coating of the blocked spectacle lens blank SFB in order to provide the second face cc with a hard coating HC, or a primer, or a primer and a hard coating HC (steps 310, 410);

vacuum coating of the blocked spectacle lens blank SFB to provide an antireflection coating AR and (optionally) a top coating TC such as a hydrophobic and/or oleophobic and/or dust repelling coating on the second face cc (steps 312, 412); and finally, (and optionally) edging of the blocked spectacle lens blank SFB to give the edge the geometry required for insertion into a spectacle frame or a spectacle holder (steps 314, 414).

All process sequences shown in the flow charts of FIGS. 1 to 4 comprise process steps providing a certain likelihood of destruction or disablement of the pre-finished non-prescription surface of the spectacle lens (blank).

SUMMARY

Therefore, it is an object of the present disclosure to provide a simplified method for manufacturing spectacle lenses according to a prescription. In particular, variants of the disclosure provide an increased degree of fail-safeness.

This object is achieved by a method for manufacturing a spectacle lens according to a prescription as disclosed herein. Further, advantageous implementations and exemplary embodiments are described below.

The inventors recognized that despite all of the manufacturing processes described in the introduction part of the description above are suitable for producing high quality individualized prescription spectacle lenses, the process sequences shown in the flow charts of FIGS. 1, 3, and 4, however, require at least one final subsequent working step of the pre-finished surface of the semi-finished spectacle lens while the process sequence shown in the flow chart of FIG. 2 requires either also at least one final subsequent working step of the pre-finished surface of the semi-finished spectacle lens or is not fail-safe per se as admitted by the applicant of the application with the publication number EP 2 093 018 A1 himself. A main aspect according to the disclosure entails splitting the spectacle lens processing method into two halves. The spectacle lens as such is processed as if it consisted of two halves corresponding to its two surfaces. The first half of the processing method is a mass manufacturing process attributed to the first surface of the spectacle lens and the second half of the processing method is a custom related process attributed to the second surface of the spectacle lens.

In other words: a main aspect of the disclosure entails that the first surface of the spectacle lens is completely manufactured according to a mass manufacturing scheme while the second surface of the spectacle lens is in its entirety manufactured according to the individual needs of the wearer. In particular, the bulk and first surface of the spectacle lens shall comprise as far as possible all physical, in particular optical, properties which do not require an adjustment according to a wearer's individual requirements and needs.

The method for manufacturing spectacle lenses according to a prescription as stipulated by the disclosure, comprises the steps of:

blocking or fixing a semi-finished spectacle lens blank having a first face possessing a final curvature and a second face opposite the first face on a block piece or a vacuum or holding chuck, respectively, wherein the first face of the semi-finished spectacle lens blank faces the block piece or the vacuum or holding chuck, respectively, surfacing the blocked or fixed semi-finished spectacle lens blank on the second face to obtain a final curvature of the second face, deblocking the surfaced spectacle lens blank from the block piece or removing the surfaced spectacle lens blank from the vacuum or holding chuck, respectively, prior to any subsequent coating step, whereby the inventive idea entails that the first face is coated with a permanent top coating having a surface energy of less than 20 mJ/m$^2$. In other words: The first face (first surface) of the semi-finished spectacle lens blank is completely finished not only in terms of contour and does not require any additional coating step in order to fulfill the desired hydrophobic, oleophobic, and dust repelling properties of the final spectacle lens.

The term "semi-finished" is used to mean as already explained in the introduction part that the spectacle lens blanks, which are usually round or oval in plan view and have not yet been edged, have already been molded or casted, machined or in another way contoured (surfaced) on one of their two optically active faces only. The surface geometry of the one of their two optically active faces is finished and will not be changed any more.

The term "blocking" of the semi-finished spectacle lens blanks is to be understood following the definition in the introduction part of the description above. During "blocking", the semi-finished spectacle lens blank is joined to a suitable block piece, for example a lens block according to German standard DIN 58766: 2017-02 or document EP 1 593 458 A2. To this end, the block piece is firstly brought into a predefined position with respect to the protected first face of the semi-finished spectacle lens blank, and then in this position the space between block piece and semi-finished spectacle lens blank SFB is filled with a molten material (normally a metal alloy or wax) or an adhesive composition that is curable, e.g., by ultraviolet or visible light, as described in EP 2 011 604 A1 for instance. Once this material has solidified or cured, the block piece forms a holder or support for machining the second face of the semi-finished spectacle lens blank. The block piece is grasped by a chuck or other suitable coupling means during lens generation to provide in particular secure mounting to the profiling machine while avoiding damage to the spectacle lens.

Also a metal-free blocking process can be an technology to hold the SFB on the generator spindle for machining, called vacuum blocking known from, e.g., OptoTech GmbH, or fixed with thermal-plastic known from Schneider GmbH or adhesive glue known from Satisloh GmbH.

The term "surfacing" shall also be understood in the manner as explained in the introduction part of the description above. In particular, spectacle lens surfacing is carried out then using profiling machines which typically have a cutter of some type that is moved across the second face cc of the semi-finished spectacle lens blank to give the second face its macrogeometry according to the wearer's prescription. The semi-finished spectacle lens blank may be stationary or rotating during the cutting operation, depending on the particular profiling machine which is being used. Typical machining processes for surfacing spectacle lenses include single point diamond turning (as the presently typical fine cutting process for plastic materials and described in, e.g., document EP 1 719 585 A2), diamond tool fly-cutting, milling (as the presently typical rough cutting process for plastic materials and described in, e.g., document EP 0 758 571 A1), and grinding processes, applied depending on the lens material.

Usually fine machining of the ophthalmic lenses then takes place, in which the pre-machined second face of the respective semi-finished spectacle lens blank is given the desired microgeometry, as described, e.g., in documents EP 1 473 116 A1 and EP 1 698 432 A2. Depending on inter alia the material of the spectacle lenses, the fine machining process is divided into a fine grinding operation and a subsequent polishing operation, or includes only a polishing operation if a polishable second face has already been produced during the pre-machining stage.

"Deblocking" means removing the block piece being joined to the spectacle lens blank.

"Surface Free energy, or interfacial free energy, quantifies the disruption of intermolecular bonds that occur when a surface is created. In the physics of solids, surfaces must be intrinsically less energetically favorable than the bulk of a material (the molecules on the surface have more energy compared with the molecules in the bulk of the material), otherwise there would be a driving force for surfaces to be created, removing the bulk of the material (see sublimation). The surface energy may therefore be defined as the excess energy at the surface of a material compared to the bulk, or it is the work required to build an area of a particular surface. Another way to view the surface energy is to relate it to the work required to cut a bulk sample, creating two surfaces." (see en.wikipedia.org/wiki/Surface energy, downloaded on Sep. 22, 2020). The surface energies are calculated according to the Owens-Wendt method described in the following reference: "Estimation of the surface force energy of polymers", Owens D. K., Wendt R. G. (1969) J. Appl. Polym. SCI, 13, pp. 1741-1747.

The above object is completely solved by a method as described in the foregoing.

According to exemplary embodiments of the disclosure the above method further includes that the permanent top coating having surface properties of at least one of the group of:

a surface energy of less than 20 mJ/m$^2$ and a contact angle of a water droplet of more than 90°, a surface energy of less than 18 mJ/m$^2$ and a contact angle of a water droplet of more than 100°, a surface energy of less than 16 mJ/m$^2$ and a contact angle of a water droplet of more than 110°, a surface energy of less than 14 mJ/m$^2$ and a contact angle of a water droplet of more than 116°, and a surface energy of less than 12 mJ/m$^2$ and a contact angle of a water droplet of more than 120°.

Contact angle measurements can be used to determine the surface energy of a material. "The contact angle is the angle, conventionally measured through the liquid, where a liquid-vapor interface meets a solid surface. It quantifies the wettability of a solid surface by a liquid via the Young equation. A given system of solid, liquid, and vapor at a given temperature and pressure has a unique equilibrium contact angle. However, in practice contact angle hysteresis is observed, ranging from the so-called advancing (maximal) contact angle to the receding (minimal) contact angle. The equilibrium contact is within those values, and can be calculated from them. The equilibrium contact angle reflects the relative strength of the liquid, solid, and vapor molecular interaction." (see en.wikipedia.org/wiki/Contact_angle, last accessed on Sep. 22, 2020). The contact angles indicated above are measured according to the static sessile drop method. "The sessile drop contact angle is measured by a contact angle goniometer using an optical subsystem to capture the profile of a pure liquid on a solid substrate. The angle formed between the liquid-solid interface and the liquid-vapor interface is the contact angle." (see en.wikipedia.org/wiki/Contact_angle).

An exemplary embodiment of the method according to the disclosure includes a step of applying on top of the top coating an adhesive tape prior to the blocking step. The use of an adhesive tape instead of a temporary protective layer as described in the introduction part of the description with reference to US 2003/0049370 A1, WO 02/092524 A1, and WO 2004/110946 A1 has the significant advantages that it provides a stable and well protective coverage of the top coating and the complete first face of the semi-finished spectacle lens blank and that adhesion of the block piece at the first face is no longer an issue. Tapes of the above described type are disclosed in WO 80/02431 A1, for example. The tape according to this document, which is one which is typically used according to the present disclosure, comprises a polymeric backing layer, a pressure sensitive adhesive on one major surface of the backing layer, and a tack-free primer layer on the other major surface of the backing. Similar tapes are, e.g., disclosed in WO 97/10923 A1, WO 97/10924 A1, JP 60135167 A2, and EP 0 285 490 A1.

An advantageous variant of this exemplary embodiment entails that the applying step comprises a sub-step of applying the adhesive tape also onto an edge between the first face and the second face. This means that the tape does not only cover the first surface or first face of the semi-finished spectacle lens blank but also (at least in part) the so-called cylinder edge, i.e., the cylinder barrel surface of the semi-finished spectacle lens blank. This variant has the advantage that the adhesion between tape and semi-finished spectacle lens blank is increased. In addition, the coatings, in particular the top coating are not only protected from the environment at its optically active face but also at its outer margins. Therefore, neither mechanical nor chemical forces may affect the interfaces between different coating layers as well as the interface between the spectacle lens bulk material and the respective covering coating layer. In addition, the likelihood that residual adhesive remains on the first face of the lens after detaping, i.e., after removing of the tape, is decreased significantly.

An exemplary embodiment of the variant includes that the adhesive tape covers a partial area of the edge of at least 20% of the total area of the edge. In other words: It is typical that not only the first face of the semi-finished spectacle lens blank is covered by the tape but in addition at least 20% of the height of the edge is also covered. Increasing the coverage of the area of the tape is typical. In particular, the preference increases according to the following sequence:

at least 30% of the total area of the edge is covered by the tape, at least 40% of the total area of the edge is covered by the tape, at least 50% of the total area of the edge is covered by the tape, at least 60% of the total area of the edge is covered by the tape, at least 70% of the total area of the edge is covered by the tape, at least 80% of the total area of the edge is covered by the tape, at least 90% of the total area of the edge is covered by the tape, 100% of the total area of the edge is covered by the tape.

Another exemplary embodiment according to the disclosure is characterized in that the adhesive tape covers a partial area of the top coating of at least one of the group of (i) at least 80% of the total area of the top coating, (ii) at least 90% of the total area of the top coating or (iii) 100% of the total area of the top coating. Increasing the total area of the coverage of the adhesive tape means increased protection of the top coating not only in the area where the block piece is attached to the first face of the spectacle lens blank.

Using an adhesive tape instead of a temporary protection layer in the form of a coating has the advantage that it may also be marked or that a marking may be applied to the tape. A typical exemplary embodiment of the inventive method is therefore characterized in a step of marking the adhesive tape. The marking may comprise, e.g., a reference to respective engravings such as, e.g., disclosed in DE 87 10 093 U1 or the marking may comprise markings such as disclosed in DE 10 2007 037 730 A1.

The method according to the disclosure may in another exemplary embodiment be characterized in the steps of:

packing the taped semi-finished spectacle lens blank prior to the blocking step and unpacking the packed and taped semi-finished spectacle lens blank prior to the blocking step.

The advantage is that the tape also serves as a protection from damage during transporting steps. Wrapping the semi-finished spectacle lens blank for transportation purposes prior to packing into a respective box, in particular a folding box, may be avoided.

In particular, a further advantageous exemplary embodiment includes a step of:

shipping the packed and taped semi-finished spectacle lens blank from a mass manufacturing site to a prescription manufacturing site. This is in particular advantageous in case the manufacturing site and the prescription manufacturing site are at different locations, in particular in different countries.

The method according to the disclosure may in some exemplary embodiments include that the deblocking step being followed by at least one of the following steps:

cleaning the spectacle lens blank applying a hard coating onto the surfaced second face, applying an anti-reflection coating onto the surfaced second face, applying a mirror coating onto the surfaced second face, applying a photochromic coating onto the surfaced second face, applying a polarizing coating onto the surfaced second face, applying a top coating having surface properties of at least one of the group of
- a surface energy of less than 20 mJ/m² and a contact angle of a water droplet of more than 90°,
- a surface energy of less than 18 mJ/m² and a contact angle of a water droplet of more than 100°,
- a surface energy of less than 16 mJ/m² and a contact angle of a water droplet of more than 110°,
- a surface energy of less than 14 mJ/m² and a contact angle of a water droplet of more than 116°,
- a surface energy of less than 12 mJ/m² and a contact angle of a water droplet of more than 120°;

onto the surfaced second face,
edging the spectacle lens blank,
fitting the edged spectacle lens into a frame, and
finally inspecting the spectacle lens blank or the edged spectacle lens.

A "hard coating" is a coating providing an enhanced ability to resist scratching. Typical hard coatings are, e.g., described in US 2008/0035053 A1 or in EP 2 437 084 A1.

An "anti-reflection coating" is a coating providing a low residual reflection and/or a desired color. An anti-reflection coating is, e.g., described in EP 2 437 084 A1, EP 2 437 085 A1, or EP 2 801 846 A1.

A "mirror coating" is a coating providing an increased residual reflection and/or a desired color. A mirror coating is, e.g., described in WO 99/21048 A1 or in WO 02/04995 A1.

A "photochromic coating" is a coating providing a reversible transformation of a chemical species between two forms by the absorption of electromagnetic radiation (photoisomerization), where the two forms have different absorption spectra. Trivially, this can be described as a reversible change of color upon exposure to light. A photochromic coating is, e.g., disclosed in WO 03/051615 A1.

Polarization is a property applying to transverse waves that specifies the geometrical orientation of the oscillations. In a transverse wave, the direction of the oscillation is transverse to the direction of motion of the wave, so the oscillations can have different directions perpendicular to the wave direction. An electromagnetic wave such as light consists of a coupled oscillating electric field and magnetic field which are always perpendicular; by convention, the "polarization" of electromagnetic waves refers to the direction of the electric field. In linear polarization, the fields oscillate in a single direction. In circular or elliptical polarization, the fields rotate at a constant rate in a plane as the wave travels. The rotation can have two possible directions; if the fields rotate in a right hand sense with respect to the direction of wave travel, it is called right circular polarization, or, if the fields rotate in a left hand sense, it is called left circular polarization. Polarizing sunglasses, in particular spectacle lenses, exploit this effect to reduce glare from reflections by horizontal surfaces, notably the road ahead viewed at a grazing angle.

A "polarizing coating" is a coating providing such polarization effect. Such coating is, e.g., described in EP 1 723 447 A1 or in EP 1 798 272 A1.

A "top coating" is—as already explained above—a coating providing certain surface properties such as hydrophobic, oleophobic and dust repelling properties. A "top coating" is in contradiction to a tape or a temporary layer, being removed prior to use, a non-temporary, i.e., permanent coating. Such a "permanent top coating" constitutes the outer surface of a spectacle lens for use by a spectacles wearer. In other words: A "permanent top coating" provides the outer surface of the finished spectacle lens being ready for use for a spectacles wearer.

"Edging" is a machining process, the aim of which is to finish-machine the edge of the spectacle lens in such a way that the spectacle lens may be inserted into a spectacle frame. "Finally inspecting" are processes in particular for checking the quality of the finished spectacle lens.

An exemplary embodiment of the method for manufacturing spectacle lenses includes at least one of the following steps:
detaping the spectacle lens blank, and
detaping the spectacle lens blank after the step of edging the spectacle lens blank.

As already indicated above, a main aspect of the disclosure entails separating mass manufacturing and custom fit manufacturing steps by attributing them to different surfaces or faces, respectively, of the spectacle lens. In other words: The idea of the inventors entails that the first surface of the spectacle lens is completely manufactured according to a mass manufacturing scheme while the second surface of the spectacle lens is in its entirety manufactured according to the individual needs of the wearer. In particular, the bulk and first surface of the spectacle lens shall comprise as far as possible all physical, in particular optical, properties which do not require an adjustment according to a wearer's individual requirements and needs.

Taking this main aspect into consideration, the method typically includes that the first face being coated with the top coating having a surface energy of less than 20 mJ/m² comprises at least one coating of the following group of coatings:
a hard coating,
an anti-reflection coating,
a mirror coating,
a photochromic coating,
a polarizing coating,
a UV-protection coating,
an IR-protection coating, and
a blue light filter coating, coating.

The terms "hard coating," "anti-reflection coating," "mirror coating," "photochromic coating," and "polarizing coating" are already described above.

A "UV-protection coating" is a coating providing UV-protection as compared to the naked spectacle lens not being covered by such coating. An example of such UV-protection coating is, e.g., disclosed in WO 2012/076714 A1.

An "IR-protection coating" is a coating providing IR-protection as compared to the naked spectacle lens not being covered by such coating. An "IR-protection coating" is, e.g., disclosed in DE 10 2016 120 122 B3.

A "blue light filter coating" is a coating providing blue light protection as compared to the naked spectacle lens not being covered by such coating. A "blue light filter coating" is disclosed in US 2017/0219848 A1, for example.

BRIEF DESCRIPTION OF THE DRAWINGS

The disclosure will now be described with reference to the drawings wherein.

DESCRIPTION OF EXEMPLARY EMBODIMENTS

Figure 1:
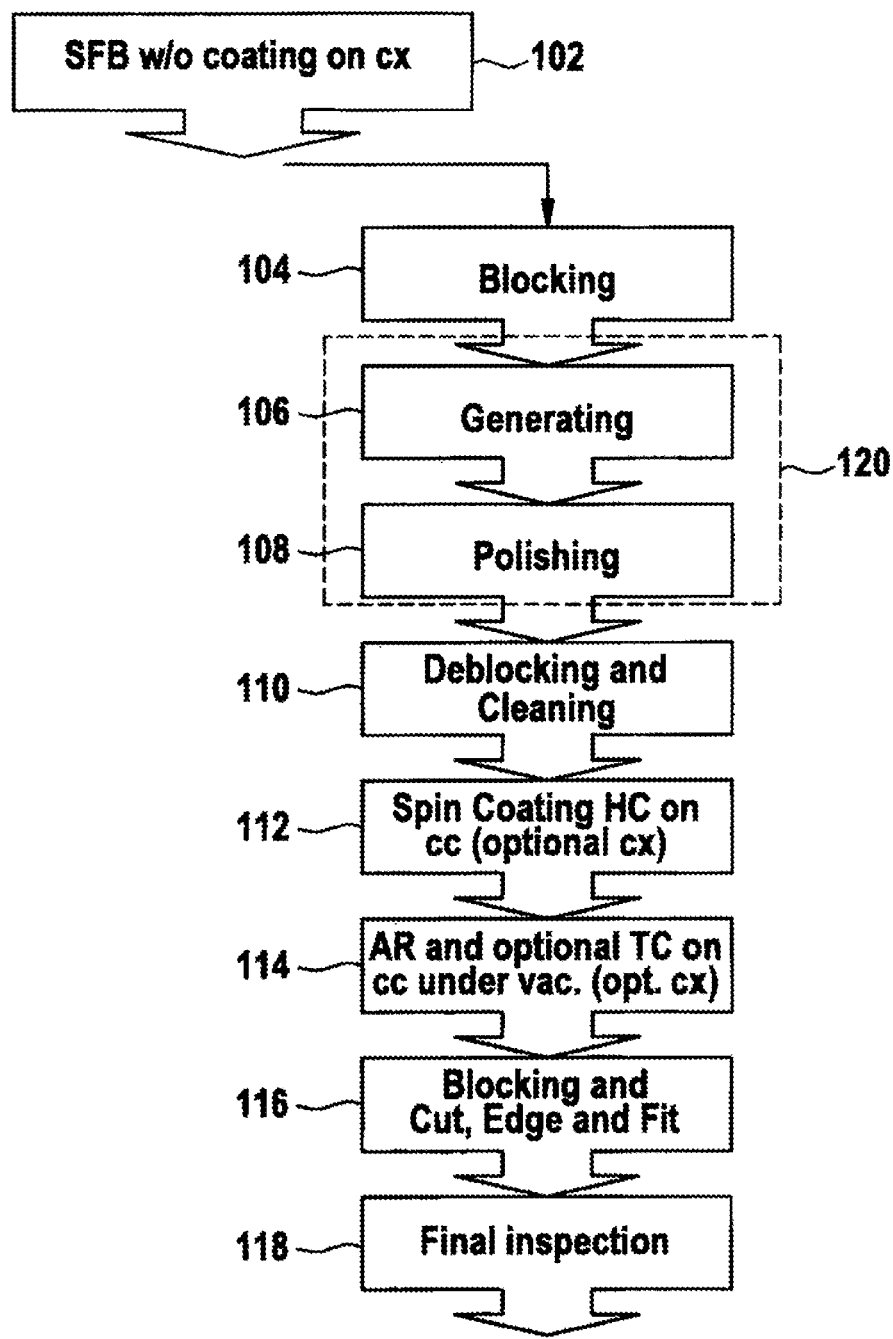
FIG. 1 shows a flow chart illustrating, inter alia, the main process steps of a method for manufacturing spectacle lenses according to paragraphs [0002] to [0010] of EP 2 093 018 A1.
Figure 2:
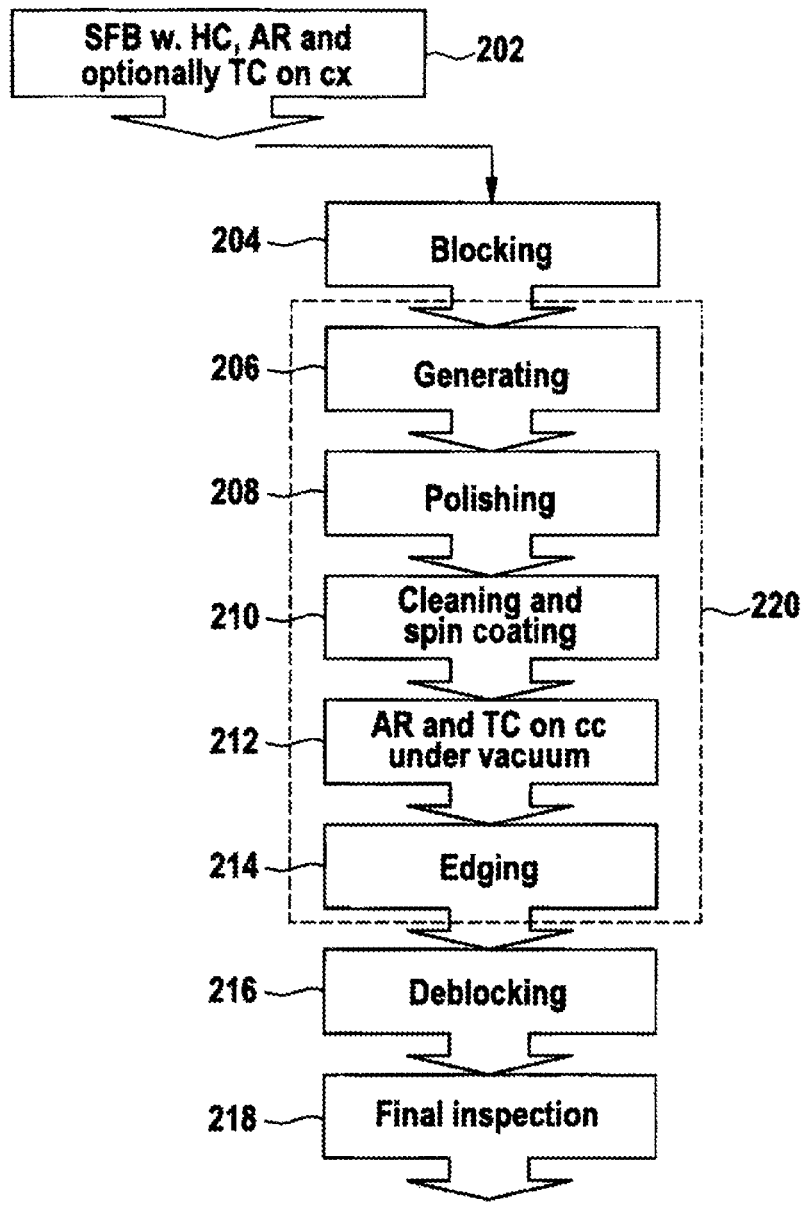
FIG. 2 shows a flow chart illustrating, inter alia, the main process steps of a method for manufacturing spectacle lenses according to FIG. 17 of EP 2 093 018 A1.
Figure 3:
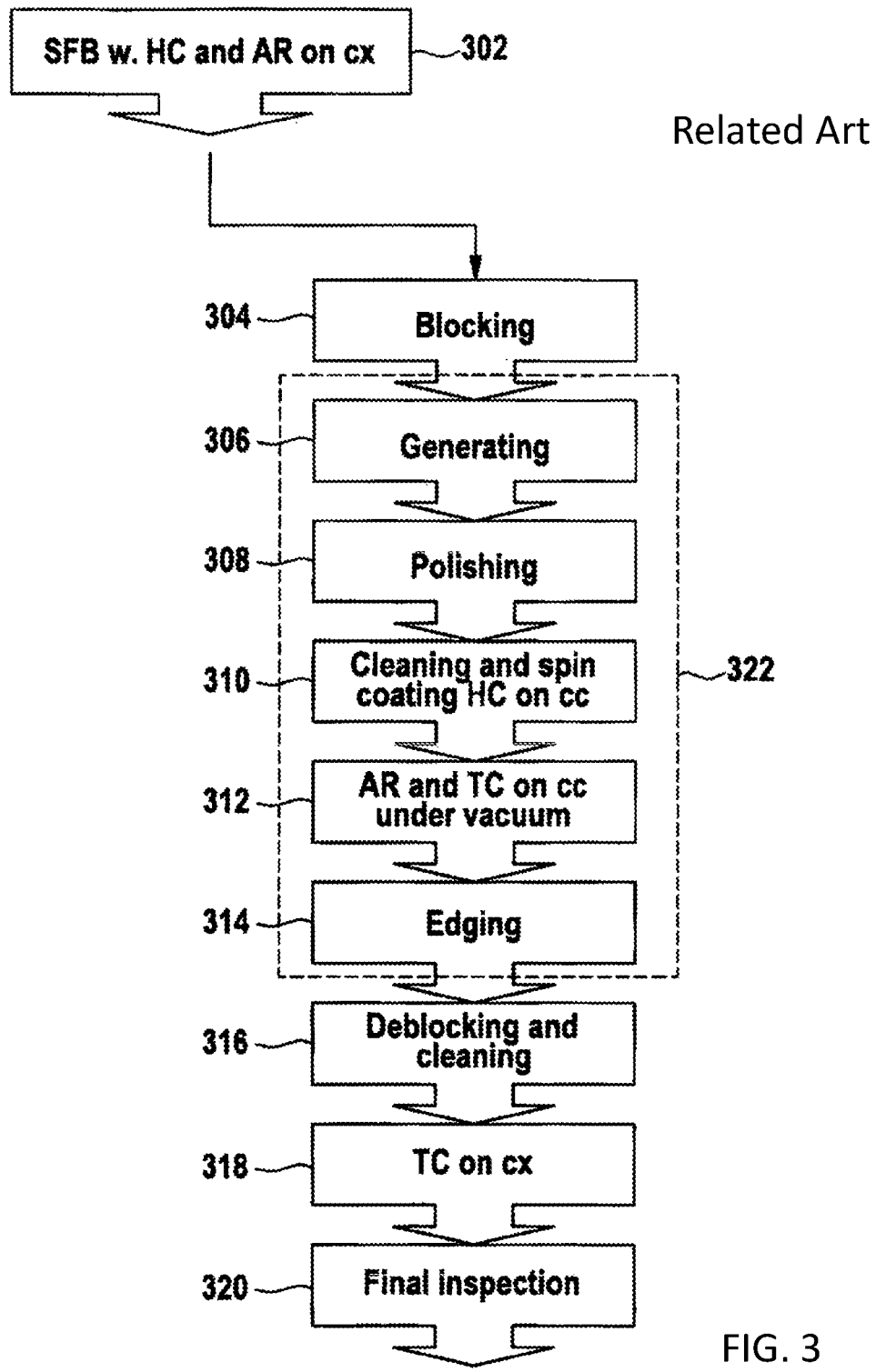
FIG. 3 shows a flow chart illustrating, inter alia, the main process steps of a method for manufacturing spectacle lenses according to FIG. 1 of EP 2 138 271 A1.
Figure 4:
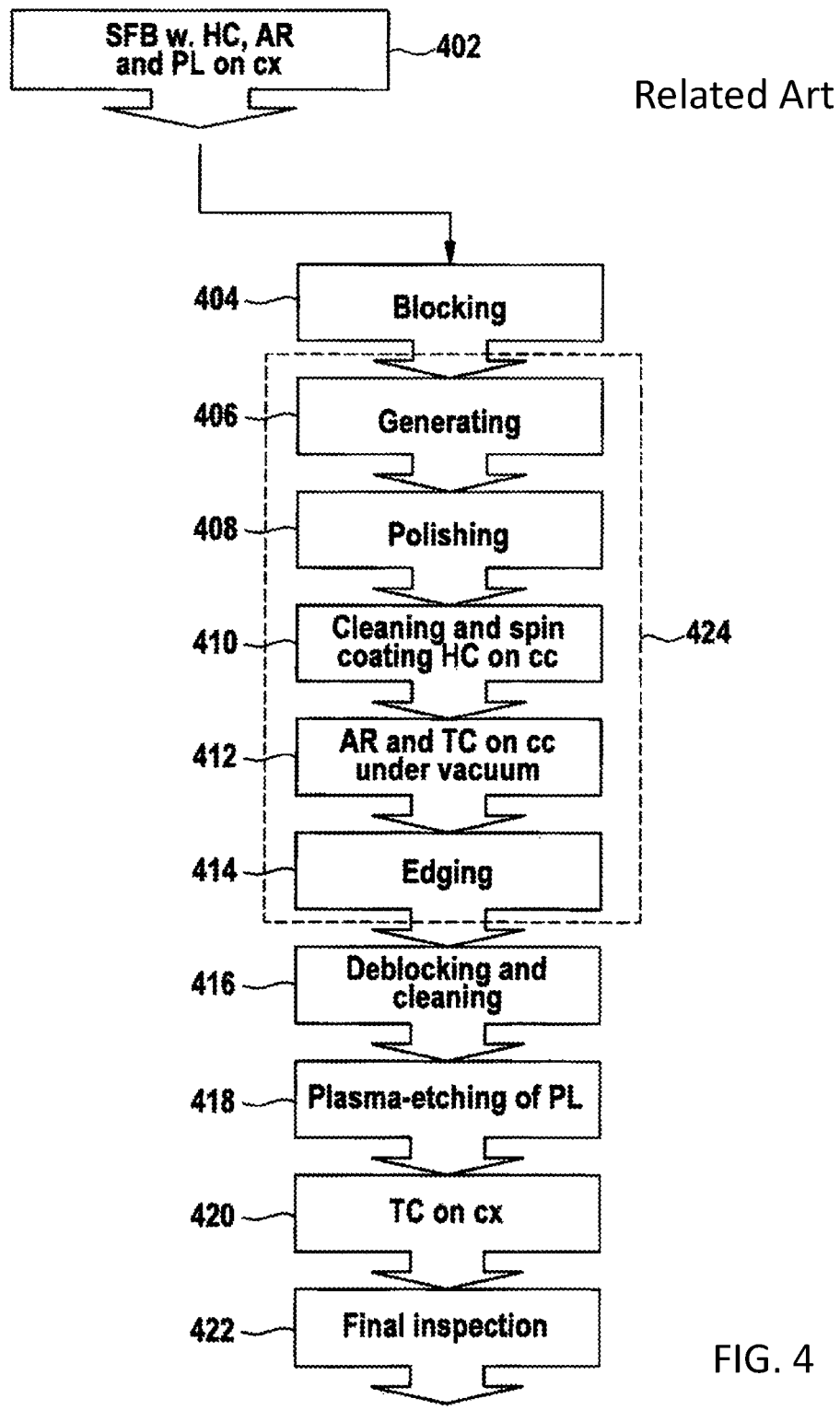
FIG. 4 shows a flow chart illustrating, inter alia, the main process steps of a method for manufacturing spectacle lenses according to FIG. 2 of EP 2 138 271 A1.
Figure 5:
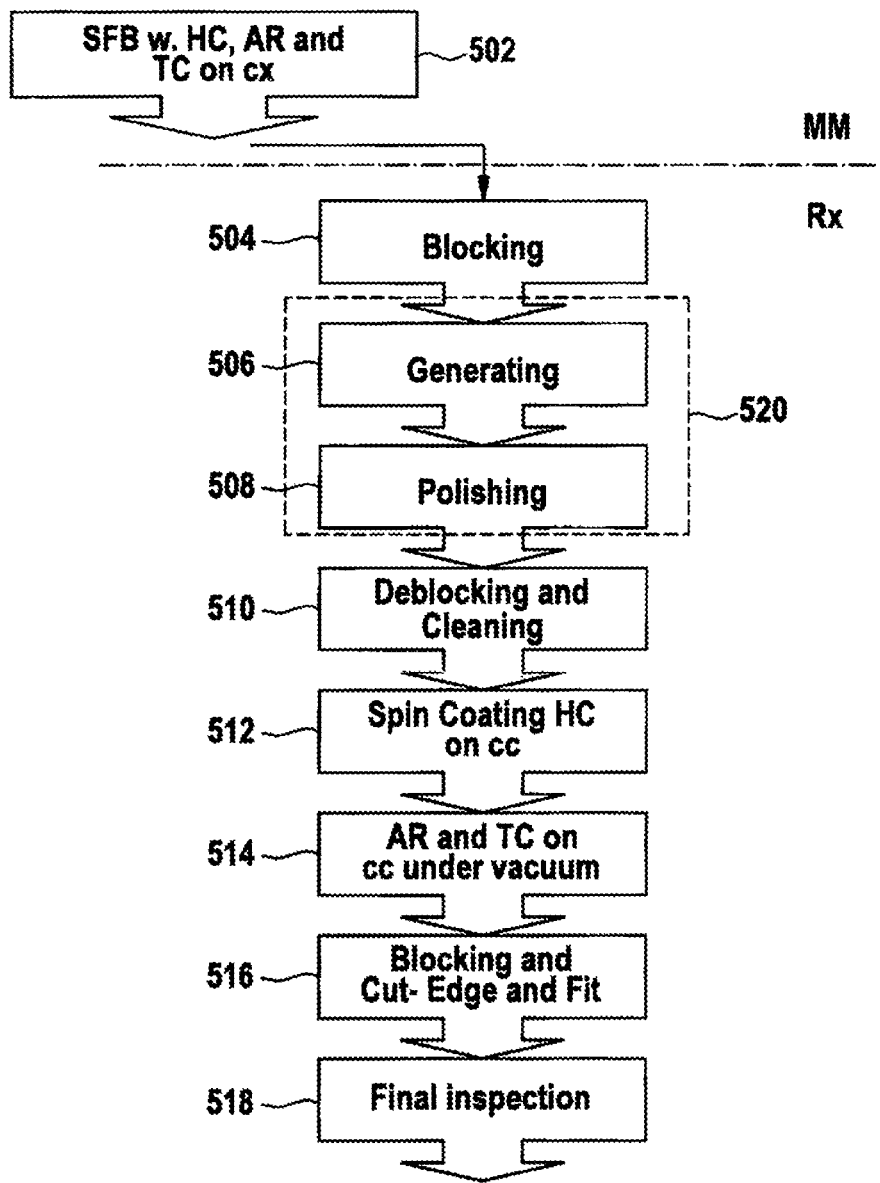
FIG. 5 shows a flow chart illustrating, inter alia, the main process steps of a method for manufacturing spectacle lenses according to a first exemplary embodiment of the present disclosure.
Figure 6:
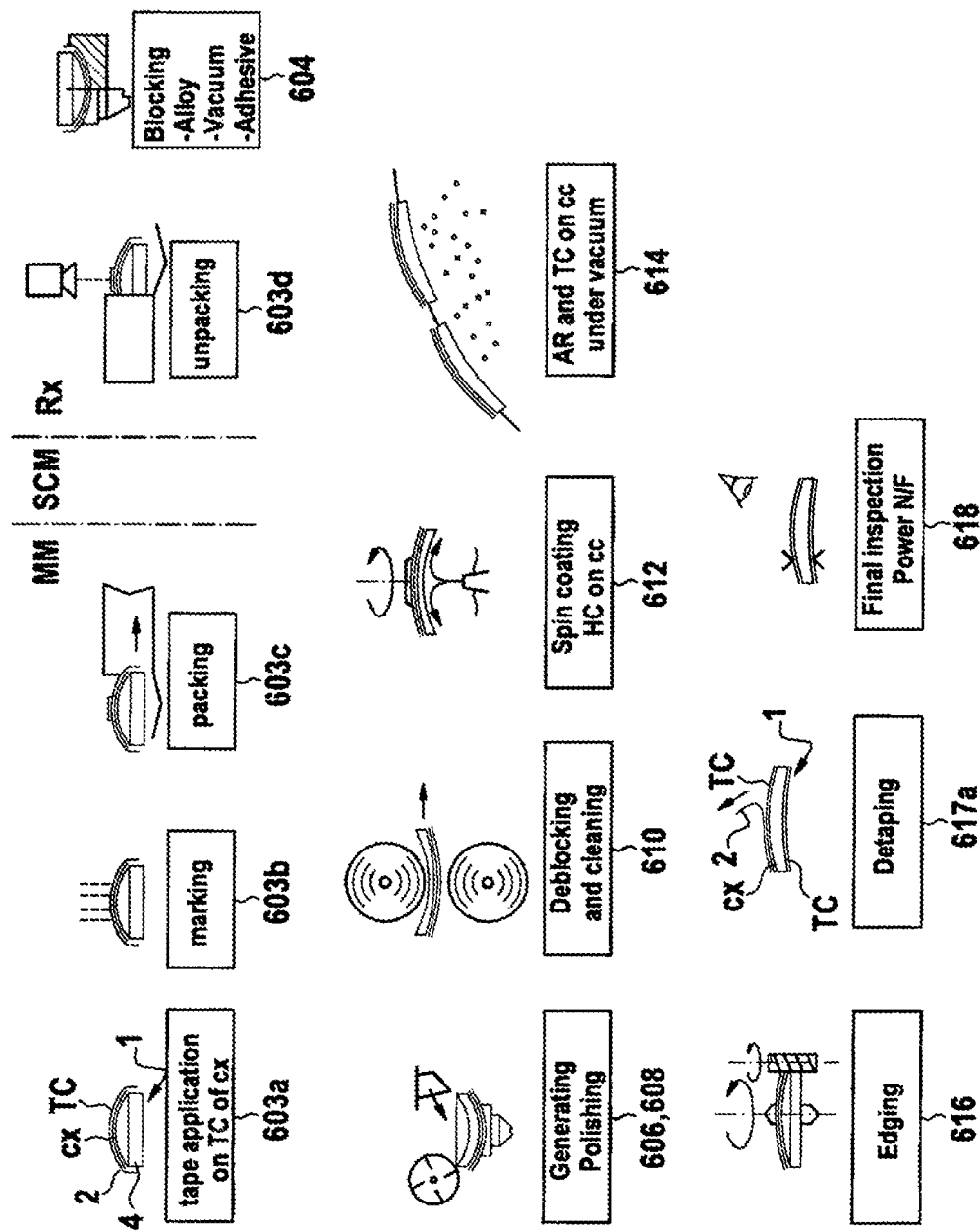
FIG. 6 shows a flow chart illustrating, inter alia, the main process steps of a method for manufacturing spectacle lenses according to a second exemplary embodiment of the present disclosure.
Figure 7:
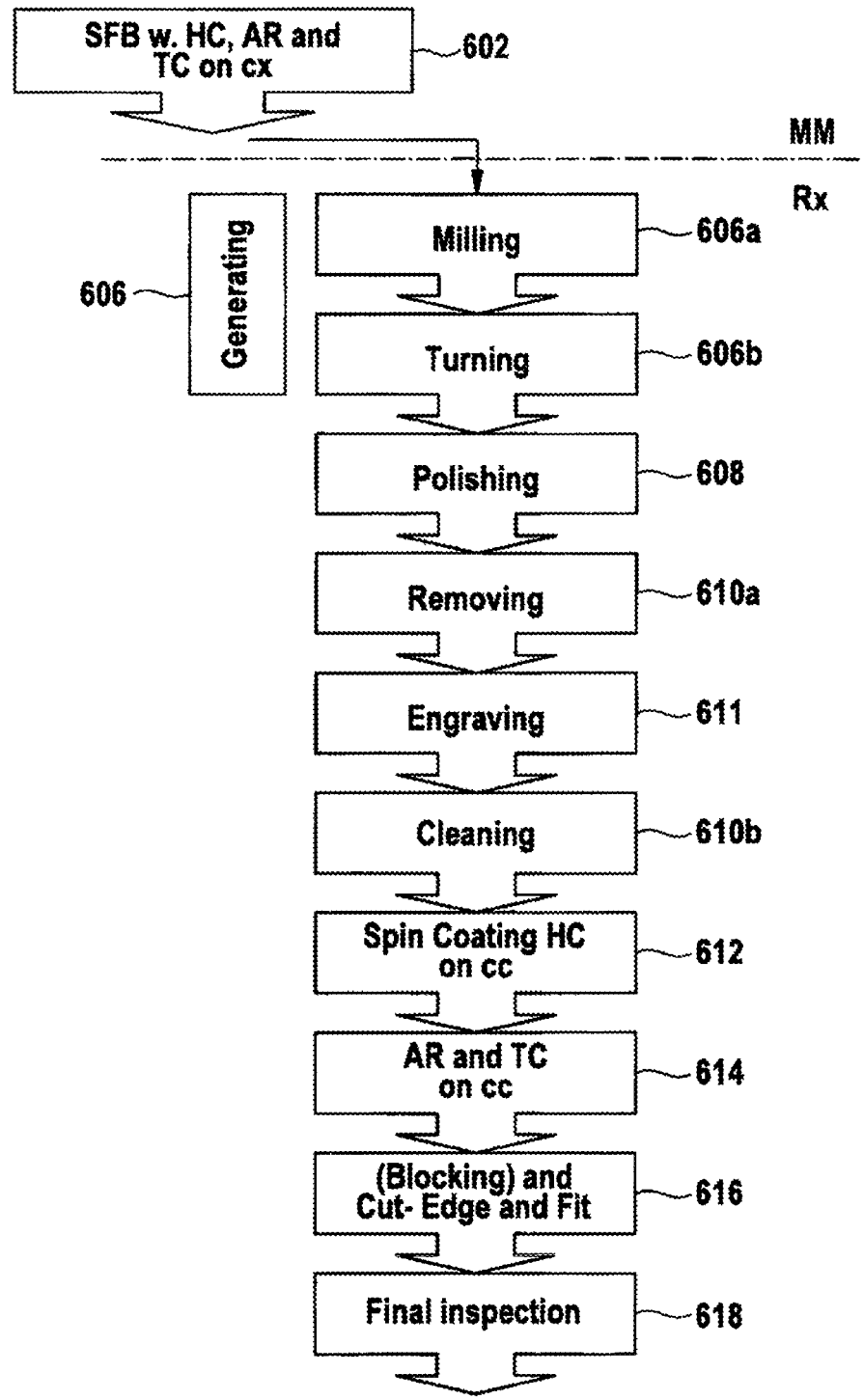
FIG. 7 shows a flow chart illustrating, inter alia, the main process steps of a method for manufacturing spectacle lenses according to a third exemplary embodiment of the present disclosure.

In the following three exemplary embodiments of a method for manufacturing spectacle lenses according to a prescription being based on the inventive concept are illustrated in FIGS. 5, 6, and 7 by way of flow charts.

The first exemplary embodiment shown in FIG. 5 comprises the following steps:

Initially, a semi-finished lens blank SFB having a first face cx, a second face cc opposite the first face cx, and an edge between the first face cx and the second face cc is provided. The first face cx possesses a final curvature and is coated with a hard coating HC and an antireflection coating AR as well as a top coating TC as an outer layer (step 502). The first face cx may optionally also comprise at least one of a photochromic coating PC, a polarizing coating POLC, a UV-protection coating UVPC, an IR-protection coating IRPC and a blue light filter coating BLFC. The semi-finished lens blank SFB as well as all coatings above are produced by a mass manufacturing process without knowing or taking into consideration specific needs of the future wearer of the finally finished spectacle lens. The fact, that the complete top coating TC as well as the coated semi-finished lens blank SFB was manufactured according to the principles of mass manufacturing is indicated in FIG. 5 with reference sign MM. Prior to blocking a tape is applied to the coated first face cx of the semi-finished lens blank SFB as well as to the complete edge of the semi-finished lens blank SFB. The tape comprises a polymer carrier and an adhesive in order to stick the tape to first face cx and edge of the semi-finished lens blank SFB.

After the taping step blocking the lens blank SFB on a block piece is executed with the aid of a blocking material, wherein the first face cx of the lens blank SFB faces the block piece (step 504).

In a subsequent step 520 the blocked lens blank SFB is processed on its second face cc and optionally its edge to obtain a processed lens. The processing or surfacing step 520 comprises the sub-steps "generating" 506 and "polishing" 508. "Generating" means machining of the blocked semi-finished spectacle lens blank SFB to give the second face cc a macrogeometry according to the prescription (step 506). "Polishing" is fine machining of the blocked spectacle lens blank SFB to give the second face cc the required microgeometry (step 508). Subsequently, deblocking the processed lens from the block piece and cleaning it (step 510) are executed.

After cleaning, a hard coating HC is applied to the second face cc typically by means of a spin coating process (step 512). In the following step 514 an antireflection coating AR as well as a top coating TC having hydrophobic, oleophobic, and/or dust repelling properties are applied under vacuum. In particular, evaporation processes may be used to deposit the respective coatings. Subsequently, blocking, cutting, edging and fitting follow in step 516. Then, final inspection of the processed lens occurs in step 518.

The second exemplary embodiment shown in FIG. 6 comprises the following processing steps:

Initially, a semi-finished spectacle lens blank 1 having a first face cx, a second face cc opposite the first face cx, and an edge 4 between the first face cx and the second face cc is provided. The first face cx possesses a final curvature and is coated with a hard coating HC and an antireflection coating AR as well as a top coating TC as an outer layer.

In step 603a a tape 2 is applied to top coating TC and edge 4. Subsequently, in step 603b a marking such as disclosed in DE 87 10 093 U1 or in DE 10 2007 037 730 A1, for example, is applied to the tape 2. The so taped and marked semi-finished spectacle lens blank 1 is packed into a folding box without any further wrapping. This packing step is indicated with reference number 603c in FIG. 6. All above process steps are executed on a mass manufacturing site MM.

The packed semi-finished spectacle lens blank 1 is then shipped (reference sign SCM) to a prescription lab, which is indicated in FIG. 6 by means of reference sign Rx. Mass manufacturing site MM and prescription manufacturing site Rx may be located in far distant locations, in particular in different countries.

At the prescription manufacturing site Rx the semi-finished spectacle lens blank 1 is unpacked (see step 603d). The taped and marked semi-finished spectacle lens blank 1 is subsequently blocked, which may be executed by means of alloy, vacuum or adhesive as described above. The respective blocking step is indicated with reference number 604 in FIG. 6. Then the processing steps "generating" 606 and "polishing" 608 are executed followed by deblocking and cleaning 610. The next steps are spin coating 612 of a hard coating HC and vacuum depositing 614 of antireflection AR and top coatings TC, edging 616, detaping 617a, and final inspection 618.

The third exemplary embodiment shown in FIG. 7 comprises the following steps:

Initially, a semi-finished lens blank SFB having a first face cx, a second face cc opposite the first face cx, and an edge between the first face cx and the second face cc is provided. The first face cx possesses a final curvature and is coated with a hard coating HC and an antireflection coating AR as well as a top coating TC as an outer layer (step 602). The first face cx may optionally also comprise at least one of a photochromic coating PC, a polarizing coating POLC, a UV-protection coating UVPC, an IR-protection coating IRPC and a blue light filter coating BLFC. The semi-finished lens blank SFB as well as all coatings above are produced by a mass manufacturing process without knowing or taking into consideration specific needs of the future wearer of the finally finished spectacle lens. The fact, that the complete top coating TC as well as the coated semi-finished lens blank SFB was manufactured according to the principles of mass manufacturing is indicated in FIG. 7 with reference sign MM. Prior to fixing the semi-finished lens blank SFB by means of a vacuum chuck or other holding chuck (not explicitly shown) a tape is applied to the coated first face cx of the semi-finished lens blank SFB as well as to the complete edge of the semi-finished lens blank SFB. The tape comprises a polymer carrier and an adhesive in order to stick the tape to first face cx and edge of the semi-finished lens blank SFB.

After the taping step fixing the lens blank SFB on the above mentioned vacuum or holding chuck is executed with the aid of a vacuum or other adhesive, wherein the first face cx of the lens blank SFB faces the vacuum chuck (not shown).

In a subsequent step the fixed lens blank SFB is processed on its second face cc and optionally its edge to obtain a processed lens. The processing or surfacing step comprises the sub-steps "generating" 606 and "polishing" 608. "Generating" means machining of the fixed semi-finished spectacle lens blank SFB to give the second face cc a macrogeometry according to the prescription (step 606). The generating step comprises the sub-steps milling 606a and turning 606b. "Polishing" is fine machining of the fixed spectacle lens blank SFB to give the second face cc the required microgeometry (step 608).

Subsequently, removing the processed lens from the vacuum or holding chuck takes place (step 610a). Subsequently, an engraving of reference marks is applied to the lens blank (step 611) prior to cleaning it (step 610b). After cleaning (step 610b) a hard coating HC is applied to the second face cc typically by means of a spin coating process (step 612). In the following step 614 an antireflection coating AR as well as a top coating TC having hydrophobic, oleophobic, and/or dust repelling properties are applied under vacuum. In particular, evaporation processes may be used to deposit the respective coatings.

Subsequently, optionally blocking, and subsequently cutting of the edge and fitting follow in step 616. Optionally blocking shall mean that, e.g., using MEI TBA unit (industrialized system) it is not necessary to block the lens again prior to edging. This is a proven block-less edging technology. Then, final inspection of the processed lens occurs in step 618.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for manufacturing a spectacle lens according to a prescription, the method comprising:
    providing a semi-finished spectacle lens blank having a first face possessing a final curvature, the first face being coated with a permanent top coating, and a second face opposite the first face;
    performing one of:
        blocking the first face being coated with the permanent top coating by mounting the semi-finished spectacle lens blank on a block piece such that the first face of the semi-finished spectacle lens blank faces the block piece; or
        fixing the semi-finished spectacle lens blank on a vacuum chuck or a holding chuck such that the first face of the semi-finished spectacle lens blank faces the vacuum chuck or the holding chuck;
    surfacing the blocked semi-finished spectacle lens blank or the fixed semi-finished spectacle lens blank on the second face to obtain a surfaced spectacle lens blank having a final curvature of the second face;
    deblocking the surfaced spectacle lens blank from the block piece or removing the surfaced spectacle lens blank from the vacuum chuck or the holding chuck prior to a subsequent coating step of the second face; and
    providing an outer surface of the first face being coated with the permanent top coating of the finished spectacle lens ready for use for a spectacles wearer and having a surface energy of less than 20 mJ/m$^2$.

2. The method according to claim 1, wherein the permanent top coating has at least one surface property selected from the group consisting of:
    the surface energy of less than 20 mJ/m$^2$ and a contact angle of a water droplet of more than 90°,
    the surface energy of less than 18 mJ/m$^2$ and the contact angle of the water droplet of more than 100°,
    the surface energy of less than 16 mJ/m$^2$ and the contact angle of the water droplet of more than 110°,
    the surface energy of less than 14 mJ/m$^2$ and the contact angle of the water droplet of more than 116°, and
    the surface energy of less than 12 mJ/m$^2$ and the contact angle of the water droplet of more than 120°.

3. The method according to claim 1, further comprising:
    applying an adhesive tape on top of the permanent top coating prior to the first face being blocked on the block piece or prior to fixing the semi-finished spectacle lens blank on the vacuum chuck or the holding chuck.

4. The method according to claim 3, further comprising:
    applying the adhesive tape also onto an edge between the first face and the second face.

5. The method according to claim 4, wherein the adhesive tape covers an area of the edge selected from the group consisting of:
    at least 20% of a total area of the edge,
    at least 30% of the total area of the edge,
    at least 40% of the total area of the edge,
    at least 50% of the total area of the edge,
    at least 60% of the total area of the edge,
    at least 70% of the total area of the edge,
    at least 80% of the total area of the edge,
    at least 90% of the total area of the edge, or
    100% of the total area of the edge.

6. The method according to claim 3, wherein the adhesive tape covers an area of the permanent top coating selected from the group consisting of:
    at least 80% of a total area of the permanent top coating,
    at least 90% of the total area of the permanent top coating, or
    100% of the total area of the permanent top coating.

7. The method according to claim 3, further comprising:
    marking the adhesive tape.

8. The method according to claim 3, further comprising:
packing the taped semi-finished spectacle lens blank prior to blocking the first face; and
unpacking the packed and taped semi-finished spectacle lens blank prior to blocking the first face.

9. The method according to claim 8, further comprising:
shipping the packed and taped semi-finished spectacle lens blank from a mass manufacturing site to a prescription manufacturing site.

10. The method according to claim 1, further comprising performing at least one of the following after deblocking:
cleaning the spectacle lens blank;
applying a hard coating onto the surfaced second face;
applying an anti-reflection coating onto the surfaced second face;
applying a mirror coating onto the surfaced second face;
applying a photochromic coating onto the surfaced second face;
applying a polarizing coating onto the surfaced second face; or
applying a top coating onto the surfaced second face, the top coating having at least one of a surface property selected from the group consisting of:
the surface energy of less than 20 mJ/m$^2$ and a contact angle of a water droplet of more than 90°,
the surface energy of less than 18 mJ/m$^2$ and the contact angle of the water droplet of more than 100°,
the surface energy of less than 16 mJ/m$^2$ and the contact angle of the water droplet of more than 110°,
the surface energy of less than 14 mJ/m$^2$ and the contact angle of the water droplet of more than 116°, and
the surface energy of less than 12 mJ/m$^2$ and the contact angle of the water droplet of more than 120°;
edging the spectacle lens blank;
fitting the edged spectacle lens into a frame; and
finally inspecting the spectacle lens blank or the edged spectacle lens.

11. The method according to claim 10, further comprising:
detaping the spectacle lens blank.

12. The method according to claim 10, further comprising:
detaping the spectacle lens blank after edging the spectacle lens blank.

13. The method according to claim 1, wherein the first face being coated with the top coating having the surface energy of less than 20 mJ/m$^2$ further comprises at least one coating selected from the group consisting of:
a hard coating,
an anti-reflection coating,
a mirror coating,
a photochromic coating,
a polarizing coating,
a UV-protection coating,
an IR-protection coating, and
a blue light filter coating.

14. A method for manufacturing a spectacle lens according to a prescription, the method comprising:
providing a semi-finished spectacle lens blank having a first face possessing a final curvature, the first face being coated with a permanent top coating having a surface energy of less than 20 mJ/m$^2$, and a second face opposite the first face;
applying an adhesive tape on top of the permanent top coating and onto an edge between the first face and the second face;
performing one of:
blocking the first face being coated with the permanent top coating by mounting the semi-finished spectacle lens blank on a block piece such that the first face of the semi-finished spectacle lens blank faces the block piece; or
fixing the semi-finished spectacle lens blank on a vacuum chuck or a holding chuck such that the first face of the semi-finished spectacle lens blank faces the vacuum chuck or the holding chuck;
surfacing the blocked semi-finished spectacle lens blank or the fixed semi-finished spectacle lens blank on the second face to obtain a surfaced spectacle lens blank having a final curvature of the second face; and
deblocking the surfaced spectacle lens blank from the block piece or removing the surfaced spectacle lens blank from the vacuum chuck or the holding chuck prior to a subsequent coating step of the second face prior to any subsequent coating step.

15. The method according to claim 14, wherein the adhesive tape covers an area of the edge selected from the group consisting of:
at least 20% of a total area of the edge,
at least 30% of the total area of the edge,
at least 40% of the total area of the edge,
at least 50% of the total area of the edge,
at least 60% of the total area of the edge,
at least 70% of the total area of the edge,
at least 80% of the total area of the edge,
at least 90% of the total area of the edge, or
100% of the total area of the edge.

16. The method according to claim 14, wherein the adhesive tape covers an area of the permanent top coating selected from the group consisting of:
at least 80% of a total area of the permanent top coating,
at least 90% of the total area of the permanent top coating, or
100% of the total area of the permanent top coating.

17. The method according to claim 14, further comprising:
marking the adhesive tape.

18. The method according to claim 14, further comprising:
packing the taped semi-finished spectacle lens blank prior to blocking the first face; and
unpacking the packed and taped semi-finished spectacle lens blank prior to blocking the first face.

19. The method according to claim 18, further comprising:
shipping the packed and taped semi-finished spectacle lens blank from a mass manufacturing site to a prescription manufacturing site.

20. The method according to claim 14, wherein the permanent top coating has at least one surface property selected from the group consisting of:
the surface energy of less than 20 mJ/m$^2$ and a contact angle of a water droplet of more than 90°,
the surface energy of less than 18 mJ/m$^2$ and the contact angle of the water droplet of more than 100°,
the surface energy of less than 16 mJ/m$^2$ and the contact angle of the water droplet of more than 110°,
the surface energy of less than 14 mJ/m$^2$ and the contact angle of the water droplet of more than 116°, and
the surface energy of less than 12 mJ/m$^2$ and the contact angle of the water droplet of more than 120°.

* * * * *